United States Patent

Kida et al.

[11] Patent Number: 5,882,234
[45] Date of Patent: Mar. 16, 1999

[54] ELECTRONIC PART WITH ATTACHED LEAD WIRES

[75] Inventors: Kosaku Kida, Shimane-ken; Koji Shingu, Izumo, both of Japan; Nobuyoshi Osuga, Taichun-shi, Taiwan; Yasuo Ikuma, Matsue, Japan

[73] Assignee: Murata Manufacturing Co., Ltd., Japan

[21] Appl. No.: 782,771

[22] Filed: Jan. 13, 1997

[30] Foreign Application Priority Data

Jan. 25, 1996 [JP] Japan ................................. 8-010503

[51] Int. Cl.⁶ ................................................. H01R 13/02
[52] U.S. Cl. ............................................. 439/884; 439/620
[58] Field of Search .................................. 439/884, 856, 439/857, 858, 620, 621, 622

[56] References Cited

U.S. PATENT DOCUMENTS 5,254,012  10/1993  Wang ........................................ 439/263

*Primary Examiner*—Khiem Nguyen
*Assistant Examiner*—Eugene G. Byrd
*Attorney, Agent, or Firm*—Ostrolenk, Faber, Gerb & Soffen, LLP

[57] ABSTRACT

A dislocation between lead wires and a main body of an electronic part has been apt to occur when cross portions of lead wires are soldered to opposed electrodes of the main body if the cross portions do not contact stably with the electrodes. In order to provide stable contact between the cross portions and the electrodes, the cross portions are bent, in a circular arc for example, so that they contact the electrodes respectively at two points.

22 Claims, 2 Drawing Sheets

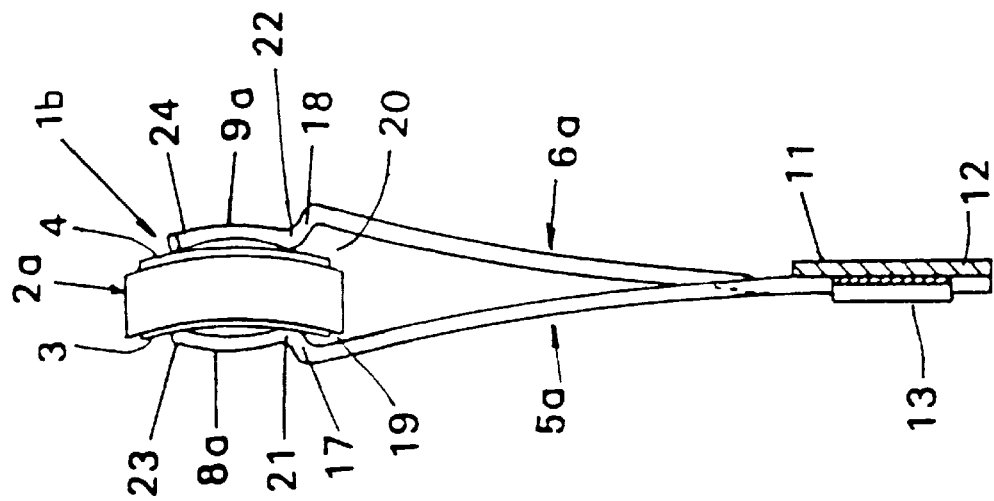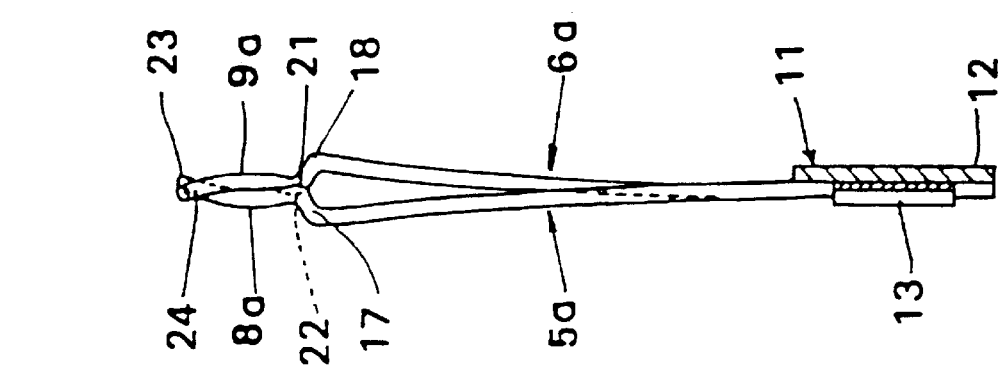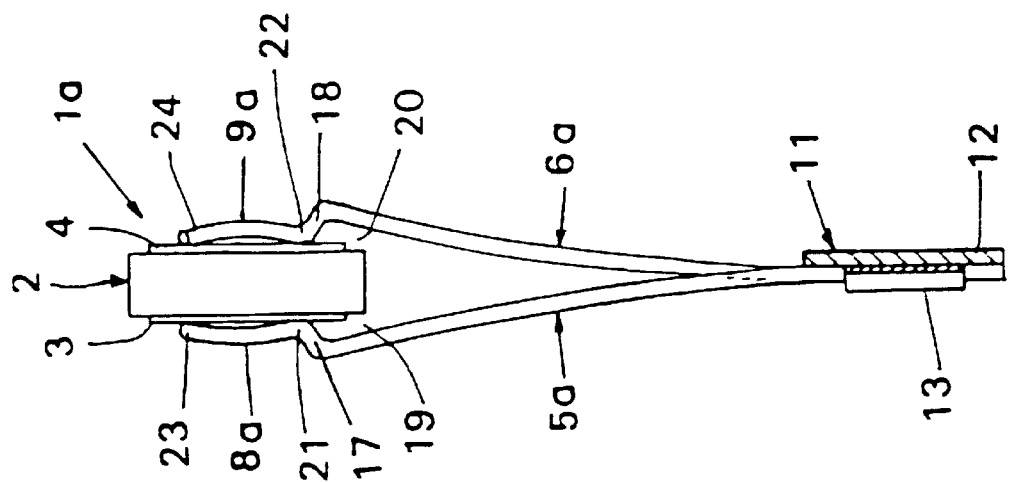

ELECTRONIC PART WITH ATTACHED LEAD WIRES

BACKGROUND OF THE INVENTION

1. Field of the Invention

The present invention relates to an electronic part with attached lead wires and more particularly to an improvement in the shape of the lead wires.

2. Description of Related Art

FIG. 4 shows an electronic part 1 with attached lead wires which is related to the background of the present invention. The electronic part 1 has a main body 2 in the shape of a disc, for example. Electrodes 3 and 4 (the electrode 4 is shown in FIG. 5) are formed respectively on two opposed main surfaces of the main body 2.

The electrodes 3 and 4 are connected electrically with lead wires 5 and 6, respectively, by solder 7 which is shown by an imaginary line in FIG. 4. Dip soldering for example is used in this soldering operation. It is noted that the solder may be applied to the lead wires 5 and 6 beforehand and then the wires may be soldered by melting the solder, instead of dip soldering. The two lead wires 5 and 6 are led out respectively in the same direction. Further, the lead wires 5 and 6 have crossing portions 8 and 9 which extend in suitable directions so as to cross each other at the parts where they are connected with the electrodes 3 and 4.

Further, a resin sheath 10 shown by an imaginary line in FIG. 4 is applied so as to cover the main body 2.

The electronic part 1 with the attached lead wires is supplied from an elongated holder 11 wherein a plurality of such parts are distributed in the longitudinal direction. The holder 11 has a carrier tape 12 and an adhesive tape 13 which is adhered to it. The holder 11 holds the electronic parts 1 by holding their lead wires 5 and 6 between the carrier tape 12 and the adhesive tape 13.

The processes of working on the lead wires 5 and 6, inserting the main body 2 between the lead wires 5 and 6, soldering the lead wires 5 and 6 to the electrodes 3 and 4, and applying the resin sheath 10 are normally carried out while the lead wires 5 and 6 are held by the holder 11. Then, in a stage of mounting the electronic parts on a circuit board, the lead wires 5 and 6 are cut along a cut line 14 for example and the electronic parts 1 with the attached lead wires 5 and 6 are separated from the holder 11.

This structure of an electronic part can be applied to a capacitor, for example. In this case, the main body 2 is made from dielectric ceramic. Electrostatic capacitance is created between the opposed electrodes 3 and 4 and is accessed via the two lead wires 5 and 6.

FIG. 5 is a right side view of the electronic part 1 shown in FIG. 4. A problem to be solved by the present invention will be explained with reference to this figure.

At the location where the lead wires 5 and 6 form the cross portions 8 and 9 at the parts thereof connected respectively with the electrodes 3 and 4 as described above, it is possible for each of the end portions of the cross portions 8 and 9 to become detached respectively from the electrodes 3 and 4, thereby creating gaps 15 and 16 between each of the end portions of the cross portions 8 and 9 and each of the electrodes 3 and 4 as shown in FIG. 5.

The gaps 15 and 16 are apt to be created when a thickness of the main part 2 is relatively large.

In order to solder the cross portions 8 and 9 to electrodes 3 and 4, bend portions 17 and 18 are often created in the lead wires 5 and 6 as shown in FIG. 5 to create distances 19 and 20 of about 0.5 mm to 1.0 mm for example between the lead wires 5 and 6 and the peripheral portion of the main body 2, in order to prevent deterioration of the withstand voltage of the electronic part 1 which otherwise occurs when the solder 7 (see FIG. 4) enters around the peripheral surface of the main body 2. However, the creation of the bend portions 17 and 18 in the lead wires 5 and 6 as described above is apt to cause the gaps 15 and 16 to be created between each of the end portions of the cross portions 8 and 9 and the corresponding electrodes 3 and 4.

Further, when the main body 2 is made from ceramic, the ceramic often warps when it is sintered during its fabrication, causing both sides of the main body 2 to be curved or irregular. The use of such a curved main body 2 also causes the gaps 15 and 16 to be created.

If the gaps 15 and 16 are thus created, the cross portions 8 and 9 barely contact the electrodes 3 and 4, having only a point-contact at bases 21 and 22 thereof. Therefore, the main body 2 is apt to rotate, centering on the contact point with the base 21 or 22, and the positional relationship between the lead wires 5 and 6 and the main body becomes instable. Thus, it is possible for the main body and the lead wires to be soldered even though they are in an inadequate positional relationship.

SUMMARY OF THE INVENTION

Accordingly, it is an object of the present invention to provide an electronic part with attached lead wires in which such undesirable dislocation between the lead wires and the main body of the electronic part is prevented.

The present invention can be applied to an electronic part with attached lead wires comprising a main body with electrodes on two opposed main surfaces thereof and two lead wires electrically connected respectively with the electrodes and led respectively in the same general direction; in which each of the lead wires forms a cross portion which extends so that the cross portions cross each other at the locations where they are connected to the corresponding electrodes. In order to solve the aforementioned problems, according to the present invention, the cross portion of each of the lead wires is bent such that it contacts the corresponding electrode at two points, with a predetermined space therebetween.

According to the present invention, because the cross portion of each of the lead wires contacts its corresponding electrode at two points, the main body of the electronic part may be held stably before the cross portion is soldered with the electrode. Therefore, the dislocation of the main body with respect to the lead wires hardly occurs and the situation wherein the main body is fixed with the lead wires in an adequate positional relationship may be avoided.

Further, because each cross portion contacts the corresponding electrode at two points, solder is reliably applied at least to those two contact points. Accordingly, the present invention also allows the reliability of the soldering of the cross portion with the electrode to be enhanced.

The above and other advantages of the present invention will become more apparent in the following description and the accompanying drawings in which like numerals refer to like parts.

BRIEF DESCRIPTION OF THE DRAWINGS

FIG. 1 is a side view showing an electronic part with attached lead wires according to a first embodiment of the present invention;

FIG. 2 is a side view showing the lead wires before the main body shown in FIG. 1 is inserted between lead wires;

FIG. 3 is a side view showing an electronic part with attached lead wires according to a second embodiment of the present invention;

DESCRIPTION OF EMBODIMENTS OF THE INVENTION

Figure 5:
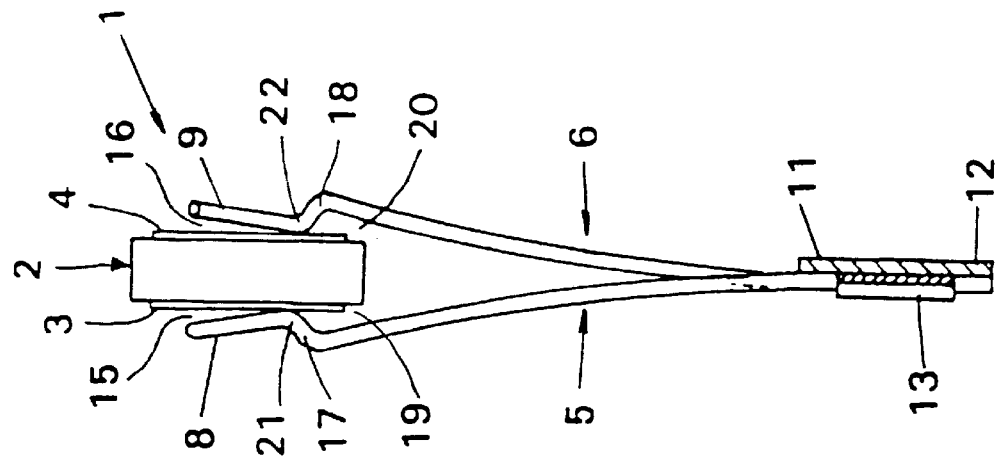
FIG. 5 is a right side view, corresponding to FIG. 4, for explaining problems of the prior art electronic part.

FIG. 1 is a side view, corresponding to FIG. 5, showing an electronic part 1a with attached lead wires according to a first embodiment of the present invention. FIG. 2 is a side view showing the lead wires 5a and 6a before a main body 2 of the electronic part is inserted between the lead wires 5a and 6a in the electronic part 1a.

Figure 4:
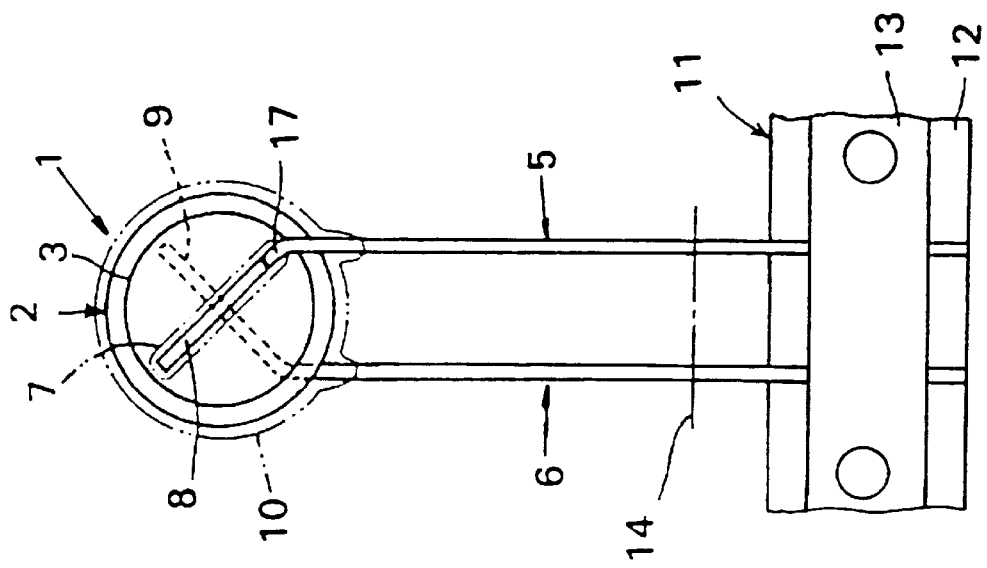
FIG. 4 is a front view of a prior art electronic part with attached lead wires which is relevant to the background of the present invention.

As is apparent when FIGS. 1 and 2 are compared with FIGS. 4 and 5, the electronic part 1a has several elements which are common with those in the electronic part 1. Accordingly, the elements shown in FIGS. 1 and 2 which correspond to those shown in FIGS. 4 and 5 are designated with the same reference numerals and their overlapped explanation will be omitted here.

The lead wires 5a and 6a and the cross portions 8a and 9a are advantageously shaped. More specifically, the cross portions 8a and 9a are bent so that they contact the electrodes 3 and 4 respectively at two points leaving a predetermined space therebetween. In the present embodiment, the cross portions 8a and 9a are bent in the shape of a circular arc so that they contact the electrodes 3 and 4 at the bases 21 and 22 as well as end portions 23 and 24 thereof.

According to the present embodiment, because the cross portions 8a and 9a contact the electrodes 3 and 4 respectively at two points, the main body 2 pinched between the lead wires 5a and 6a can be stably held. Accordingly, this embodiment suppresses the failures which have been caused by the dislocation between the main body 2 and the lead wires 5a and 6a when the cross portions 8a and 9a are soldered with the electrodes 3 and 4 respectively by the solder 7 (see FIG. 4). It also allows the reliability of the soldering to be enhanced.

Although not shown in FIG. 1, a resin sheath 10 shown in FIG. 4 is applied as necessary to the electronic part 1a.

FIG. 3 shows an electronic part 1b according to a second embodiment of the present invention. It shows that the cross portions 8a and 9a can contact the respective electrodes at two points even if the main body 2a pinched by the lead wires 5a and 6a is curved. It can be seen that even if the main body 2a is a curved sintered body such as ceramic, it can be contacted and held steadily.

It is noted that the curved shape given to the cross portions 8a and 9a may be changed to an irregular bent shape, instead of the circular arc shown in FIG. 3. Further, although the cross portions 8a and 9a contact the electrodes 3 and 4 respectively at the bases 21 and 22 as well as the end portions 23 and 24 thereof in the embodiment described above, the shapes of the cross portions 8a and 9a may be changed so that they contact the electrodes 3 and 4 at portions thereof spaced away from the end portions 23 and 24 by a predetermined distance, instead of contacting at the end portions 23 and 24.

Additionally, although the cross portions 8a and 9a of the lead wires 5a and 6a have had the bend portions 17 and 18 for creating gaps 19 and 20 in the electronic part 1a attached with lead wires shown in FIG. 1, the present invention may be applied to an electronic part attached with lead wires having cross portions which do not have this type of bend portions.

The present invention may be applied also to an electronic part in which the electrical connection between lead wires and electrodes is made by a method other than soldering.

Further, although the electronic part 1a shown in FIG. 1 has been constructed with the intention of creating a capacitor with attached lead wires, the present invention may also be applied to another electronic part with attached lead wires having a similar mechanical structure.

Although the present invention has been described in relation to particular embodiments thereof, many other variations and modifications and other uses will become apparent to those skilled in the art. Therefore, the present invention is not limited by the specific disclosure herein.

What is claimed is:

1. An electronic part with attached lead wires, comprising:
   a main body having first and second opposed main surfaces;
   first and second electrodes formed on said first and second main surfaces, respectively; and
   first and second lead wires electrically connected to said first and second electrodes, respectively, said electrodes extending away from said main body, said first and second lead wires having respective cross portions which contact said first and second electrodes, respectively, said cross portions crossing each other as they extend along said opposed main surfaces, each said cross portion being bent such that it contacts its respective said electrode at first and second spaced contact points.

2. An electronic part as in claim 1, wherein each said second contact point is an end portion of a respective said cross portion.

3. An electronic part as in claim 2, wherein each of said lead wires further has a bend portion which defines a respective one of said first contact points.

4. An electronic part with attached lead wires, comprising:
   a main body having first and second opposed main surfaces;
   first and second electrodes formed on said first and second main surfaces, respectively; and
   first and second lead wires electrically connected to said first and second electrodes, respectively, and extending from said main body;
   said first lead wire being fixedly coupled to said first electrode at two spaced contact points on said first electrode, said second lead wire being fixedly coupled to said second electrode at two spaced contact points on said second electrode.

5. An electronic part as in claim 4, wherein one said contact point of each said lead wire is an end portion of that lead wire.

6. An electronic part as in claim 5, wherein the other said contact point of each of said lead wires is defined by a bend portion of said lead wire.

7. An electronic part as in claim 1, wherein said first and second lead wires are fixedly attached to said first and second electrodes, respectively.

8. An electronic part as in claim 7, wherein said first and second lead wires are fixedly attached to their respective electrode at its respective first and second spaced contact points.

9. An electronic part as in claim 8, wherein portions of said lead wires which extend away from said main body run generally parallel to one another.

10. An electronic part as in claim 8, wherein said cross portions are bent into a generally arcuate shape.

11. An electronic part as in claim 8, wherein said cross portions are bent into a semi-circular shape.

12. An electronic part as in claim 3, wherein all of said contact points are removed from the periphery of said main body.

13. An electronic part as in claim 1, wherein all of said contact points are removed from the periphery of said main body.

14. An electronic part as in claim 13, wherein each of said lead wires includes a bend portion which extends from said first contact points to a position removed from said main body so that there is a space between said bend portion and said main body.

15. An electronic part as in claim 1, further including a resin sheath formed around said body portion and covering said cross portions of said first and second lead wires.

16. An electronic part as in claim 3, further including a resin sheath formed around said body portion and covering said cross portions of said first and second lead wires.

17. An electronic part as in claim 8, further including a resin sheath formed around said body portion and covering said cross portions of said first and second lead wires.

18. An electronic part as in claim 4, wherein portions of said lead wires which extend away from said main body run generally parallel to one another.

19. An electronic part as in claim 4, wherein each of said contact points are removed from the periphery of said main body.

20. An electronic part as in claim 19, further including a resin sheath formed around said body portion and covering said cross portions of said first and second lead wires.

21. An electronic part as in claim 4, further including a resin sheath formed around said body portion and covering said cross portions of said first and second lead wires.

22. An electronic part as in claim 6, further including a resin sheath formed around said body portion and covering said cross portions of said first and second lead wires.

* * * * *